(12) United States Patent
Lu et al.

(10) Patent No.: US 7,962,557 B2
(45) Date of Patent: Jun. 14, 2011

(54) AUTOMATED TRANSLATOR FOR SYSTEM-GENERATED PREFIXES

(75) Inventors: Fang Lu, Billerica, MA (US); Weisong Wang, Westford, MA (US)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 11/951,714

(22) Filed: Dec. 6, 2007

(65) Prior Publication Data
US 2009/0150496 A1    Jun. 11, 2009

(51) Int. Cl.
*G06F 15/16* (2006.01)
(52) U.S. Cl. .................................. 709/206; 709/205
(58) Field of Classification Search .......... 709/206; 707/104.1
See application file for complete search history.

(56) References Cited

U.S. PATENT DOCUMENTS

| | | | | |
|---|---|---|---|---|
| 6,766,179 | B1 * | 7/2004 | Shiau et al. | 455/566 |
| 7,561,674 | B2 * | 7/2009 | Naick et al. | 379/88.06 |
| 7,761,525 | B2 * | 7/2010 | Moraes et al. | 709/206 |
| 2001/0049627 | A1 * | 12/2001 | Simpson | 705/14 |
| 2002/0110235 | A1 * | 8/2002 | Simpson et al. | 379/377 |
| 2002/0193986 | A1 * | 12/2002 | Schirris | 704/8 |
| 2003/0063113 | A1 * | 4/2003 | Andrae | 345/700 |
| 2005/0160167 | A1 * | 7/2005 | Cheng et al. | 709/224 |
| 2006/0036691 | A1 * | 2/2006 | Schultz | 709/206 |
| 2006/0179056 | A1 * | 8/2006 | Rosenberg | 707/6 |
| 2006/0217963 | A1 * | 9/2006 | Masuichi et al. | 704/7 |
| 2007/0016613 | A1 * | 1/2007 | Foresti et al. | 707/104.1 |
| 2007/0112554 | A1 * | 5/2007 | Goradia | 704/4 |
| 2008/0228719 | A1 * | 9/2008 | Abhyanker et al. | 707/3 |
| 2009/0204389 | A1 * | 8/2009 | Wang et al. | 704/7 |
| 2009/0319257 | A1 * | 12/2009 | Blume et al. | 704/7 |
| 2009/0326917 | A1 * | 12/2009 | Hegenberger | 704/7 |

* cited by examiner

*Primary Examiner* — Bunjob Jaroenchonwanit
(74) *Attorney, Agent, or Firm* — Cantor Colburn LLP; Raymond Szeto

(57) ABSTRACT

A method is provided for localizing a prefix in a subject header field of an incoming electronic message. The method comprises receiving a value string of a subject header in an electronic message; identifying a system-generated prefix in the value string by parsing the value string and accessing a database storing a plurality of system-generated prefixes and a corresponding comparable local prefix for each of the plurality of system-generated prefixes; and converting the system-generated prefix to its corresponding comparable local prefix in the database.

5 Claims, 3 Drawing Sheets

AUTOMATED TRANSLATOR FOR SYSTEM-GENERATED PREFIXES

BACKGROUND OF THE INVENTION

1. Field of the Invention

Exemplary embodiments of the present invention relate to electronic messaging, and more particularly, to system-generated prefixes in the subject header field of electronic mail messages.

2. Description of Background

In computer communication networks, one method of communication is electronic mail (email), in which a sending user prepares and sends a message over some form of computer network to a receiving user, usually on a remote system. Most email clients, which are front-end computer programs that are used to read, write, and send email messages, also provide software to facilitate reading, saving, printing and replying to email. Because email messages can be sent at any time across the world as easily as across the office, to a group of people or a single recipient, without the user leaving his or her desk, email can provide considerable benefits over traditional paper based memos and postal systems. Until recently, the use of electronic mail was the single biggest generator of traffic volume on the Internet.

A typical email message consists of lines of ASCII test and is structured to begin with a set of message header fields (or header lines) that is followed by a message body. Some header fields are mandatory and others are optional. The header fields have a fixed format that includes a keyword name immediately after newline that is followed by a colon character, a space, and a value, which consists of a string of bytes in the field alter the colon that is continued on non-null subsequent lines. The usual header fields for an email message include at least the 'From:' field, which provides the email address of the message's sender and optionally the name of the sender; the 'To:' field, which the provides the email address(es) of the message's recipient(s) and optionally the name(s) of the recipient(s); the 'Subject:' field, which can provide a brief summary or indicate the nature of the message's contents, and the 'Date:' field; which provides the local time and date when the message was written. The message body follows the headers and is separated from them by a blank line.

An active email user sends and receives a number of messages in any given day. Some messages that are received are junk mail that can be discarded unread, some are urgent alerts to be dealt with immediately, and other messages are pushed aside until the user has spare time available to read them. Because most email client programs include features to display a one-line summary of each message that typically includes the value of the subject field, truncated if necessary, a user can utilize the information provided in 'Subject' header field, or subject header, to aid in making these decisions, as well as to locate old messages that have pushed aside when a time to read them arises. The subject header value typically contains free-from text that concisely indicates the general topic(s) discussed in the message.

Current technology allows for people to communicate across the globe with others who speak and understand different languages. Nevertheless, even though people are able to communicate with a common language, their local email clients can be configured differently. For example, where a US-localized email client adds or prepends a 'Re:' character string prefix to the subject header value of an email that is being replied to, that same character string is displayed by the recipient's email client when the message is being read, independently of the recipient's client localization. In another example, where a first user using a US-localized email client sends an email to a second user that is using an email client localized for China (that is, set to Chinese (PRC)), if the second user replies, the first user's email client may display the word Reply in Chinese as □□ prepended to the subject header value or, if the first user does have a Chinese font or language pack installed that would support the display of these symbols, the first user's email client may simply display gibberish where the reply prefix would appear in the subject header field. This may lead to results that are confusing for the first user, as well as to other users if, for instance, the reply message is later forwarded to a third user. The appearance of unrecognizable subject header value prefixes can also have many other undesirable effects including, for example, disassociating the reply or forward messages from the message thread from which the messages arose in email client applications that use the subject line for message arrangement or sorting. These problems can be exacerbated if the email clients involved are configured to prepend additional prefixes without trimming any previously added prefixes from the subject line.

SUMMARY OF THE INVENTION

The shortcomings of the prior art can be overcome and additional advantages can be provided through exemplary embodiments of the present invention that are related to a method for localizing a prefix in a subject header field of an incoming electronic message. The method comprises receiving a value string of a subject header in an electronic message; identifying a system-generated prefix in the value string by parsing the value string and accessing a database storing a plurality of system-generated prefixes and a corresponding comparable local prefix for each of the plurality of system-generated prefixes; and converting the system-generated prefix to its corresponding comparable local prefix in the database.

The shortcomings of the prior art can also be overcome and additional advantages can also be provided through exemplary embodiments of the present invention that are related to computer program products and data processing systems corresponding to the above-summarized method are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to enable an email message recipient's local email client application to detect various system-generated prefixes within the subject header fields of incoming email messages and convert the prefixes to local equivalent or comparable prefixes that accord with the form specified by or to the local email client.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
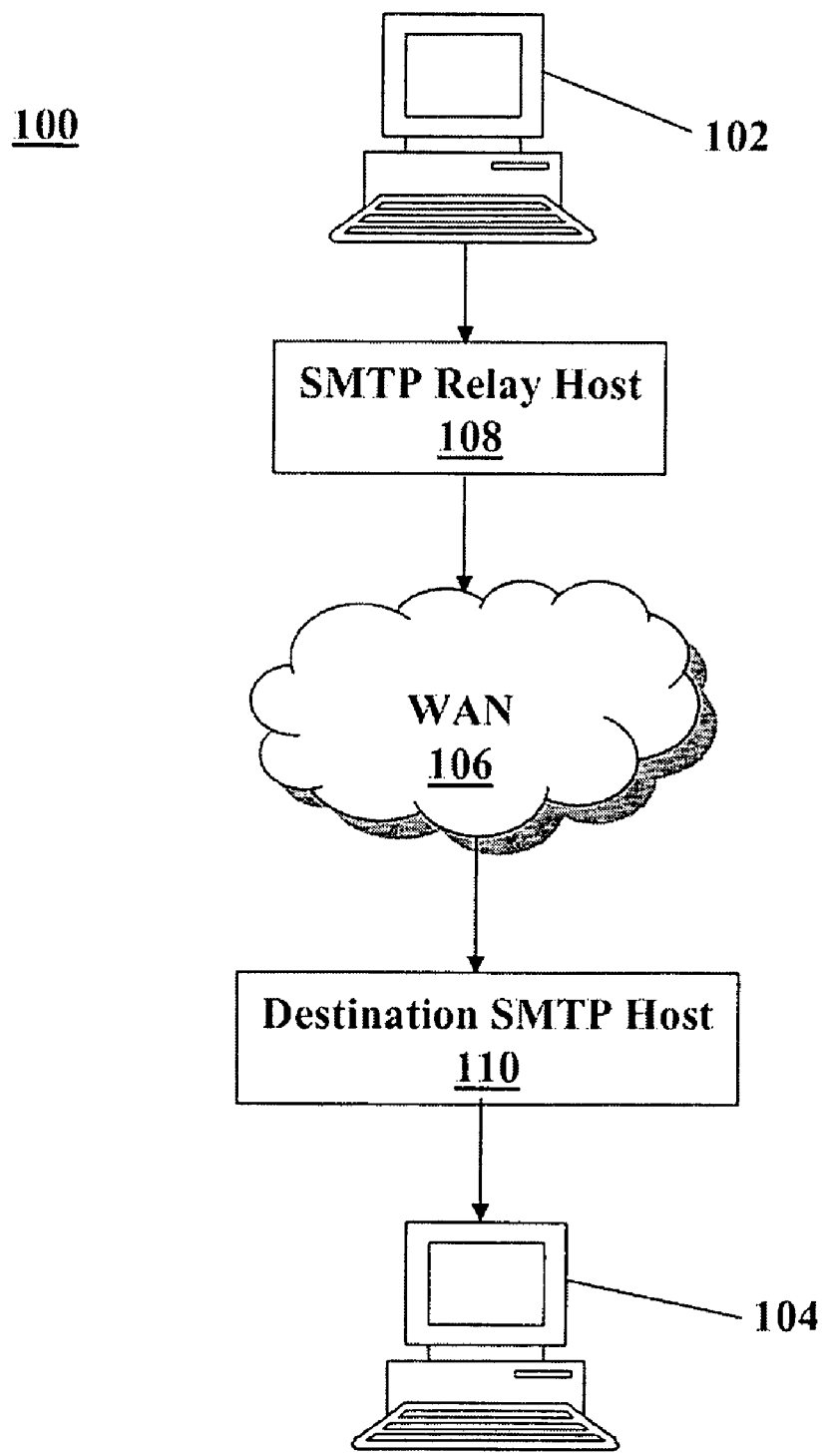
FIG. 1 is a block diagram illustrating an exemplary embodiment of a general process of receiving an incoming email message.

Referring now to FIG. 1, a block diagram illustrating an exemplary embodiment of a process of receiving an incoming email message is provided. FIG. 1 includes sender client computer 102 and recipient client computer 104, operated by respective sender and recipient users, and shows the path or flow of an incoming email message. To initiate the message flow, sender client computer 102 sends an email that travels through a wide area network (WAN) 106 (for example, the Internet) to recipient client computer 104. In the present exemplary embodiment, the email message is delivered according to the Simple Mail Transfer Protocol (SMTP) specifications as defined in RFC 2821, published by the Internet Society in April 2001 (and available on the Internet). This document is herein incorporated by reference. Initially, the email is accepted for delivery at a SMTP relay host 108 that is used by the sender's email client (usually the delivery agent software on the machine running or in the same organization as the sender's email client). SMTP relay host 108 then establishes a TCP connection over WAN 106 to a destination SMTP host 110 that can be accessed by the recipient's email client or mail user agent. SMTP relay host 108 then transmits the message over WAN 106 to the recipient's mailbox, as defined by the recipient's email address, on destination SMTP host 110. The message is then stored on destination SMTP host 110 until retrieved by the recipient's email client (for example, the next time the recipient checks for new email at the destination SMTP host using recipient client computer 104) using, for example, the Internet Message Access Protocol (IMAP) or the Post Office Protocol (POP).

In exemplary embodiments, the recipient of an email message, including the user of client computer 104 in FIG. 1, can utilize a myriad of email clients, which range from proprietary email clients (thick clients) to web-based interfaces that retrieve email messages in which the user agent function is provided by a Web server and/or a back-end program (for example, a CGI program) running on the same system as the destination SMTP host. Once retrieved through any suitable email client, an email message can be viewed at the recipient's terminal, which will now be described in greater detail.

In exemplary embodiments, the computer systems of client computers 102 and 104 can be one or more Personal Computers (PCs) (for example, IBM or compatible PC workstations running the Microsoft Windows operating system or Linux OS, Macintosh computers running the Mac OS operating system, or equivalent), Personal Digital Assistants (PDAs), hand held computers, palm top computers, smart phones, game consoles, or any other suitable information processing devices. In other exemplary embodiments, the computer systems of one or more of client computers 102 and 104 and boundary mail server 108 can be a server system (for example, SUN Ultra workstations running the SunOS operating system, IBM RS/6000 workstations and servers running the AIX operating system, or an IBM zSeries eServer running z/OS, z/VM or Linux OS). An exemplary computer system for client computers 102 and 104 is described in greater detail below with reference to FIG. 3.

In exemplary embodiments, WAN 106 can be a circuit switched network, such as the Public Service Telephone Network (PSTN), a packet switched network (which can be a wide area network (WAN), such as the global Internet, a private WAN, a telecommunications network or any combination of the above-mentioned networks), a wired network, a wireless network, a broadcast network, or a point-to-point network.

Currently, the industry standard specifying a syntax for email text messages that are sent between computer users is "Request for Comments 2822" (RFC 2822), published by the Internet Society in April 2001 (and available on the Internet). This document is herein incorporated by reference. Section 2 of RFC 2822 provides a lexical analysis of a standard email message, describing an email as consisting of multiple header fields followed, optionally, by a value string. The header fields are a sequence of lines of characters with special syntax as defined in RFC 2822. Header fields are lines composed of a field name, followed by a colon (":"), followed by a field body or value string, and terminated by CRLF. The value string is simply a sequence of characters that follows the header fields and is separated from the header fields by an empty line (that is, a line with nothing preceding the Carriage Return Line Feed, or CRLF).

RFC 2822 specifies certain header field bodies or values as having a restricted syntactical structure that comprises a sequence of specific lexical tokens. These are referred to as "structured" field values. Certain other field values are defined in RFC 2822 simply as "unstructured" (which is specified as any US-ASCII characters, except for CR and LF) with no further restrictions. Semantically, unstructured field values are generally treated as a single line of characters with no further processing. The 'Subject:' field value, which can provide a brief summary or indicate the nature of the message's contents, is an example of a field value that is specified as unstructured.

Often, email messages are sent as reply messages in response to a previous message. The parent of a response is the message to which a reply message responds. The parent may have been a response to yet another message, and there can also be other messages with the same parent, grandparent, etc. A collection of messages with a common ancestor is usually called a thread. Typically, when an email client program generates a reply message to a previous message, the email client will preserve the subject header field of the earlier message but will prepend the subject header field value (or subject line) with a prefix character string such as 'Re:' to indicate that the message is a reply to an earlier message. It is also common for email client programs to prepend the subject line of an earlier message being forwarded with a character string such as 'Fw:' or 'Fwd:'. Although current messaging standards only state that "Re:" should be used as the prefix string to mark replies, some email programs, such as those configurable to interfaces in non-English languages, will use other character strings for either message replies or forwards. Because different programs may use variant prefixes, a thread of replies and/or forwards to an original parent message by several users using variously configured email clients may result in a recipient receiving a message having subject line that has been prepended with a string of different or unrecognizable prefix characters.

Exemplary embodiments of the present invention can be implemented to enable a message recipient's local email client to "localize" email client-generated prefixes within the subject headers of incoming email messages in accordance with the recipient's local formatting settings by detecting and converting prefixes within the subject headers to the form specified by or to the local email client. Exemplary embodiments can be implemented to convert any email client-generated prefixes within the subject headers of incoming email messages prior to or during retrieval of the incoming messages by a recipient using his or her email client application. Exemplary embodiments can be implemented, for instance, to translate any foreign language prefixes in the subject line of an incoming email message to equivalent or comparable prefixes in the language used by the recipient on his or her local computer system.

Exemplary embodiments of the present invention can utilize a database or other data repository to store all commonly used email client-generated prefixes (for example, "Re:" and "Fwd:") and their equivalent or comparable prefixes. For example, the database can be configured to store a set of prefixes generated one email client in one language and a set of equivalent or comparable prefixes in another language. The database can comprise be any suitable data repository for storing, managing, and retrieving data. In exemplary embodiments, the database may be internal to a recipient's email client application or, alternatively, reside externally on a separate machine. In exemplary embodiments, the commonly used email client-generated prefixes can be installed within the database using data packages such as, for example, language packages, that correspond to sets of prefixes locally added by various email client programs.

Figure 2:
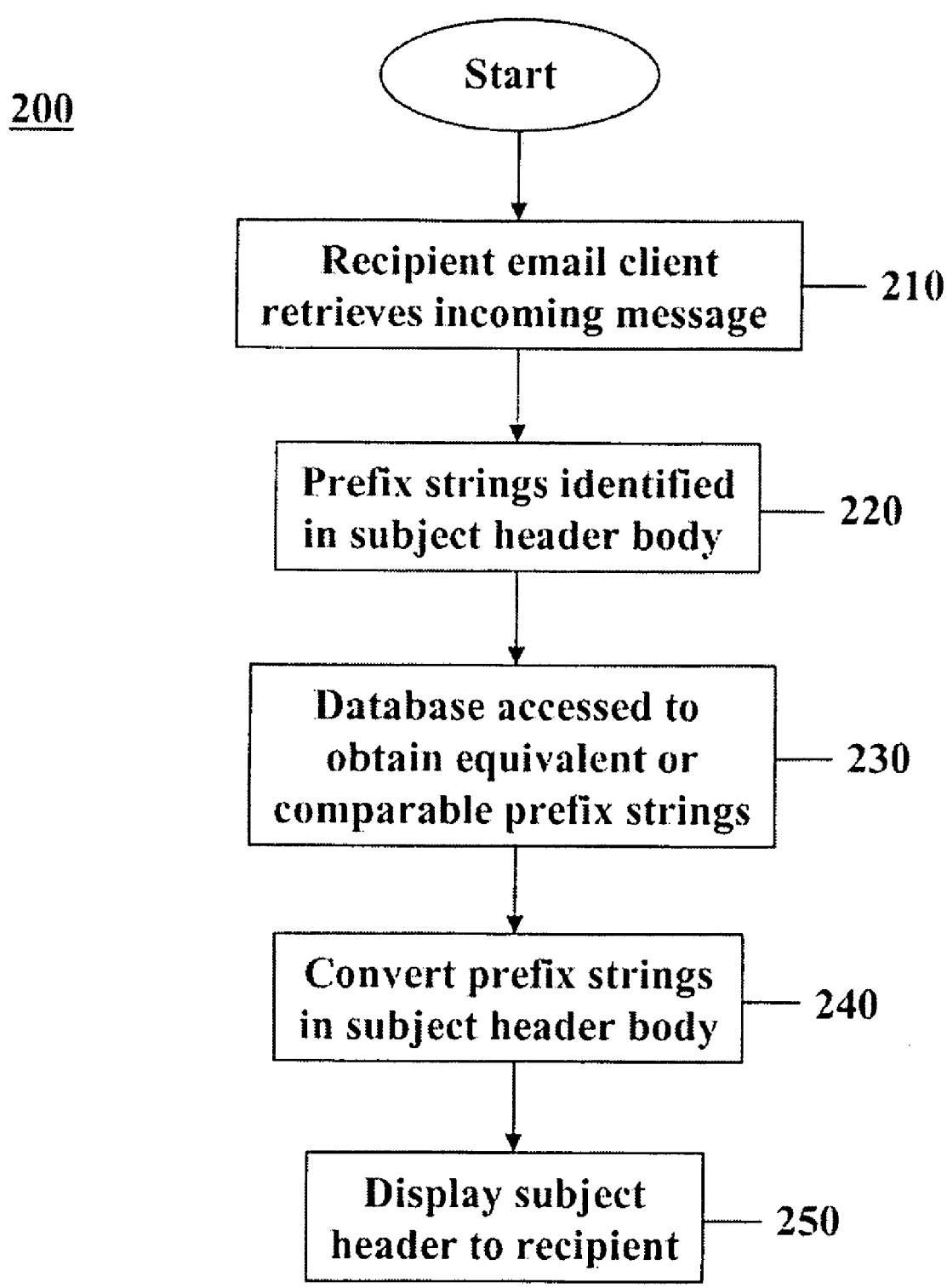
FIG. 2 is a flow diagram is illustrating an exemplary embodiment of a general process of converting prefix strings within the subject header of an incoming email message in accordance with the present invention.

Referring now to FIG. 2, a flow diagram is provided illustrating an exemplary embodiment of the operation and general control flow of a process 200 of converting prefix strings within the subject header of an incoming email message to the appropriate form as specified by or to the local email client used by the recipient. It should be recognized that FIG. 2 is exemplary only, and that one skilled in the art would recognize various modifications and alternatives, all of which are considered as a part of the present invention.

Exemplary process 200 begins at block 210 with the recipient using his or her local email client to retrieve an incoming email message that includes a subject header. At block 220, the subject header field of the retrieved email message is examined to identify or extract any prefix strings in the subject header. This can be performed by parsing, pattern matching, or otherwise iterating through the subject header value string and accessing the database of commonly used email client-generated prefixes to search for matches to character strings in the subject header. For instance, process 200 can be implemented with a function that accepts an email message subject header value string, parses the subject header value string into individual tokens that correspond to individual prefix strings in the subject header value for which a match is found in the database, and returns a pointer to the identified prefix string tokens.

At block 230, the database is accessed to obtain an equivalent or comparable prefix string form that accords with the local settings or preferences specified by or to the local email client each for each prefix string in the subject header as received that is identified as having a match in the database. This can be performed by querying the database with each identified or extracted prefix string in the subject header of the message as received along with the local setting specifications, and receiving the local equivalent or comparable prefix string in return, which can, for example, be stored in a dynamically-allocated memory buffer on the recipient's computer system. In exemplary embodiments, the local settings or preferences can be specified according to, for example, the user's local computer system settings, the user's email client application, or a system administrator for an organizational email server. In other exemplary embodiments, if the applicable local settings or preferences have not specified to or are not specified by the local email client, the user can be prompted or otherwise provided with options at block 230 to specify these settings or preferences.

In the present exemplary embodiment, at block 240, each prefix string in the subject header as received is converted to its local equivalent or comparable prefix string as returned by the database at block 230. Finally, at block 250, the email message having any email client-generated prefix strings in the subject header converted to local equivalent or comparable prefix strings is provided to the recipient for review. As a result, when the subject line of the email message is displayed by the recipient's email client, the user will see, for example, the local equivalent or comparable translation of any foreign language prefix that has added to the subject header, and can easily determine, for example, whether the message was replied to, forwarded, etc.

In exemplary embodiments, conversion process 200 can be implemented to identify and convert prefix strings in subject header values that contain only ASCII characters, as well as those that contain information in non-ASCII character sets such as, for example, non-English characters represented using encoded words according to encoding syntax as defined by the Multipurpose Internet Mail Extensions (MIME) standard in RFC 2047, published by the Internet Society in November 1996 (and available on the Internet). This document is herein incorporated by reference.

In exemplary embodiments, conversion process 200 can be accomplished at the recipient user's email client application, for example, as an aspect of the email client software or an add-on or extension to the email client that expands the application's functionality. Exemplary embodiments of the present invention can be implemented in any email client program module or software agent configured to display email message subject header values to users, such as, for example, graphical email clients like Apple Mail, Eudora, Lotus Notes, Microsoft Outlook, and Pegasus Mail, test-based email clients like Gnus and Pine, and Web-based email clients like Hotmail and Gmail. Alternatively, exemplary embodiments can be implemented as a component of a software library for use by stand-alone applications. The conversion process can be implemented so that the integrity of email messages sent over the Internet (or other similar public or private network or internetwork) between and amongst the senders and recipients of email messages is fully maintained. In exemplary embodiments, conversion process 200 can implemented in situations where email messages are retrieved by an organizational user utilizing organizational email server and connectivity as well as for an individual user retrieving email messages from an Internet Service Provider (for example, Hotmail, Yahoo mail, Post Office Protocol 3 (POP-Version 3), etc.).

Exemplary embodiments of the present invention can be realized in hardware, software, or a combination of hardware and software. Exemplary embodiments can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 3:
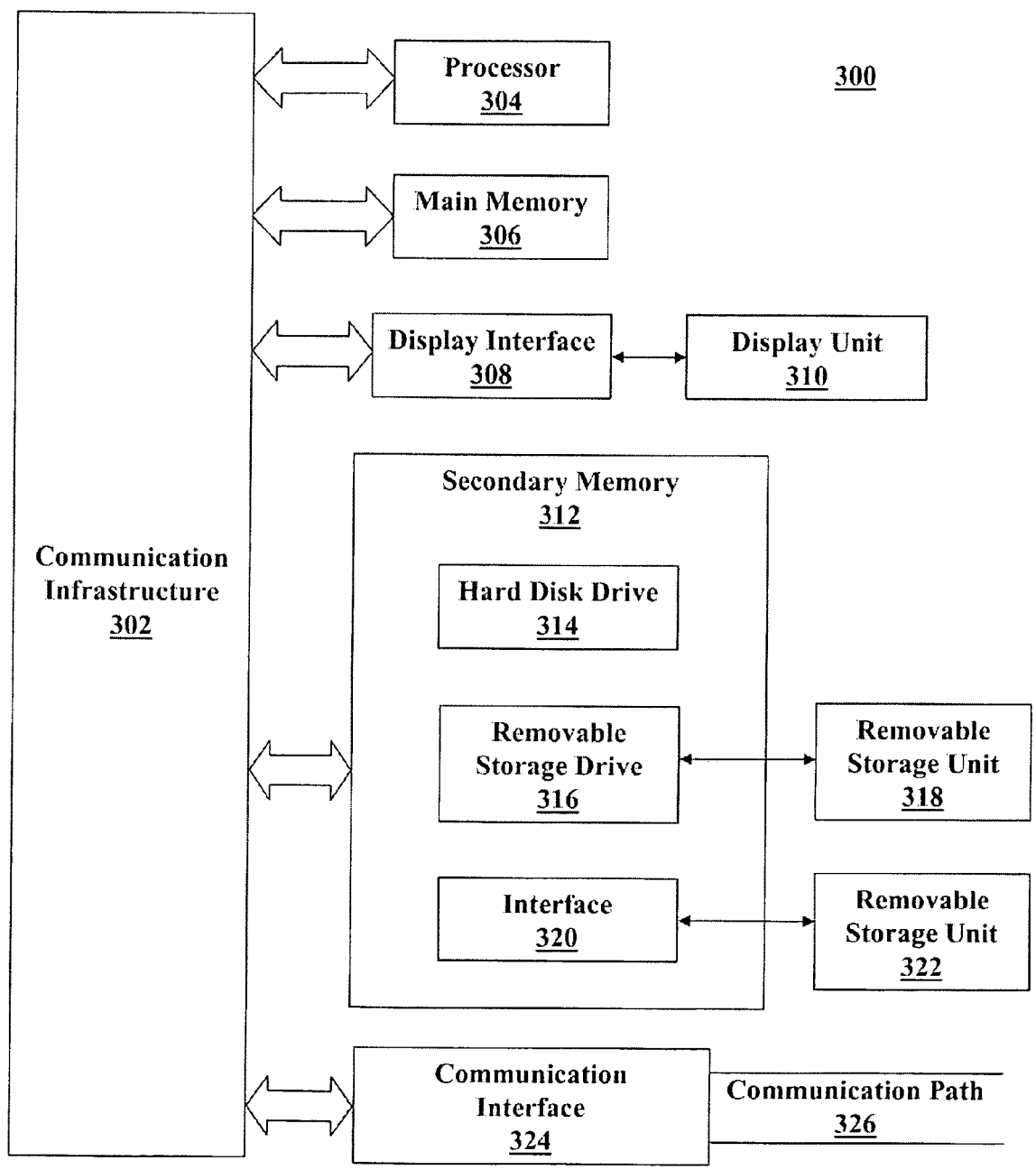
FIG. 3 is a block diagram illustrating an exemplary computer system that can be used for implementing exemplary embodiments of the present invention.

FIG. 3 is a block diagram of an exemplary computer system 300 that can be used for implementing exemplary embodiments of the present invention. Computer system 300 includes one or more processors, such as processor 304. Processor 304 is connected to a communication infrastructure 302 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 300 can include a display interface 308 that forwards graphics, text, and other data from the communication infrastructure 302 (or from a frame buffer not shown) for display on a display unit 310. Computer system 300 also includes a main memory 306, which can be random access memory (RAM), and may also include a secondary memory 312. Secondary memory 312 may include, for example, a hard disk drive 314 and/or a removable storage drive 316, representing a floppy disk drive, a magnetic tape drive, an optical disk drive, etc. Removable storage drive 316 reads from and/or writes to a removable storage unit 318 in a manner well known to those having ordinary skill in the art. Removable storage unit 318, represents, for example, a floppy disk, magnetic tape, optical disk, etc. which is read by and written to by removable storage drive 316. As will be appreciated, removable storage unit 318 includes a computer usable storage medium having stored therein computer software and/or data.

In exemplary embodiments, secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCMCIA slot and card, etc. Software and data transferred via communications interface 324 are in the form of signals which may be, for example, electronic, electromagnetic, optical, or other signals capable of being received by communications interface 324. These signals are provided to communications interface 324 via a communications path (that is, channel) 326. Channel 326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 306 and secondary memory 312, removable storage drive 316, a hard disk installed in hard disk drive 314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 306 and/or secondary memory 312. Computer programs may also be received via communications interface 324. Such computer programs, when executed, can enable the computer system to perform the features of exemplary embodiments of the present invention as discussed herein. In particular, the computer programs, when executed, enable processor 304 to perform the features of computer system 300. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for localizing a prefix in a subject header field of an incoming electronic message according to local settings of an email client of a user computer, the method comprising:
    receiving a value string of a subject header in an electronic message by the email client in the user computer;
    identifying a system-generated prefix in the value string by parsing the value string by the email client in the user computer;
    accessing a database by the email client in the user computer, the database storing in the user computer a plurality of system-generated prefixes and a corresponding comparable local prefix for each of the plurality of system-generated prefixes for the subject heading of the electronic message;
    wherein the plurality of system-generated prefixes stored in the database of the user computer comprise prefixes in one language for the subject heading of the electronic message; and
    wherein the corresponding comparable local prefix for each of the plurality of system-generated prefixes stored in the user computer comprises prefixes in a different language for the subject heading of the electronic message;
    converting by the email client in the user computer the system-generated prefix for the subject heading of the electronic message to its corresponding comparable local prefix stored in the database of the user computer;
    wherein the local settings for the subject heading in the electronic message are specified to the email client in the user computer and stored in the database of the user computer; and
    in response to the local settings for the subject heading not being specified to the email client in the user computer and not being stored in the database of the user computer, prompting by the email client of the user computer the user to specify the local settings for the subject heading of the electronic message.

2. The method of claim 1, wherein the corresponding comparable local prefix for each of the plurality of system-generated prefixes in the database is determined by the email client of the user computer according to a set of local specifications for a recipient email client;
    further comprising translating by the email client of the user computer the system-generated prefix by searching the plurality of system-generated prefixes in the one language to match the corresponding comparable local prefix in the different language.

3. The method of claim 2, wherein the system-generated prefix is in a first language, and wherein the corresponding comparable local prefix for the system-generated prefix is in a second language, the second language being determined according to the set of local specifications for the recipient email client.

4. The method of claim 1, wherein the system-generated prefix comprises non-American standard code for information interchange (ASCII) values represented using multipurpose Internet mail extensions (MIME)-encoded words.

5. The method of claim 2, wherein the recipient email client is selected from graphical email clients, text-based email clients, and Web-based email clients.

* * * * *